United States Patent
Sase et al.

[11] Patent Number: 6,060,862
[45] Date of Patent: May 9, 2000

[54] RECHARGEABLE ELECTRONIC APPARATUS

[75] Inventors: Masahiro Sase; Kiyotaka Igarashi, both of Tokyo; Kenji Fujita, Saitama, all of Japan

[73] Assignee: Citizen Watch Co., Ltd., Tokyo, Japan

[21] Appl. No.: 09/051,646

[22] PCT Filed: Aug. 21, 1997

[86] PCT No.: PCT/JP97/02903

§ 371 Date: Nov. 24, 1998

§ 102(e) Date: Nov. 24, 1998

[87] PCT Pub. No.: WO98/08146

PCT Pub. Date: Feb. 26, 1998

[51] Int. Cl.[7] ............................................. H02J 7/00
[52] U.S. Cl. ................................. 320/132; 320/130
[58] Field of Search .............................. 320/132, 130, 320/149, 148, 128

[56] References Cited

U.S. PATENT DOCUMENTS

| | | | |
|---|---|---|---|
| 3,938,021 | 2/1976 | Kosmin | 320/148 |
| 5,729,117 | 3/1998 | Fukuda | 320/117 |
| 5,739,667 | 4/1998 | Matsuda et al. | 320/128 |
| 5,818,201 | 10/1998 | Stockstad et al. | 320/119 |

*Primary Examiner*—Peter S. Wong
*Assistant Examiner*—Lawrence Luk
*Attorney, Agent, or Firm*—Greer, Burns & Crain, Ltd.

[57] ABSTRACT

A electrical-generating type of electronic apparatus, such as a rechargeable electronic watch capable of allowing the user to easily verify the detection of the charge capacity of the battery is provided, this being a rechargeable electronic apparatus 100 having an electrical generation means 3, an electrical storage means 7, a reverse-flow prevention means 5 that prevents reverse flow of charging current to the electrical storage means 7, and a time display means 6 which has the electrical storage means 7, which is charged by the electrical generation means 3, as a power source, this apparatus further being provided with a charging condition detection means 30, which detect the charging condition of the electrical storage means 7, a charging cutoff means 9 which is provided in a charging path between the electrical generation means 3 and the electrical storage means 7, and a charging condition notification means 6 that makes notification of the charging condition of the electrical storage means 7, based on a detection signal from the charging condition detection means 30, the charging condition detection means 30 causing the charging cutoff means to operate during the detection of the charging condition of the electrical storage means 7, so as to cut off the charging.

11 Claims, 13 Drawing Sheets

RECHARGEABLE ELECTRONIC APPARATUS

FIELD OF THE INVENTION

The present invention relates to an apparatus that displays the charging condition of an electrical storage means that is the power supply of a rechargeable electrical apparatus such as an electrical-generating type electronic watch.

BACKGROUND ART

There have been many techniques in the past for displaying the residual capacity of a power supply in a rechargeable electronic apparatus, including in an electrical-generating electronic watch.

For example, in the Japanese Examined Utility Model Publication (KOKOKU) No. 54-29709, there is disclosure of technology that samples a battery voltage, A/D converts the battery voltage from the output of that sampling, and digitally displays the value thereof.

The prior art will be described below, with reference made to relevant drawings. FIG. 12 is a circuit block diagram of a electrical-generating electronic watch, which is an example of a rechargeable electronic apparatus in the past.

In FIG. 12, the reference numeral 1 denotes an overall control circuit, which outputs a sampling signal P1 that controls a voltage detection circuit 2 to be described later and a display control signal P6 that controls a display means 6; 2 is a voltage detection circuit that detects the voltage of an electrical storage means 70 to be described later and which outputs a full-charge detection signal P20; and 3 is an electrical generating means, which in this case is a solar cell.

The reference numeral 4 denotes an overcharging prevention means, which is operated by a signal from the voltage detection circuit 2; 5 is a reverse-flow prevention means; and 6 is a display means which displays the time and the like. The reference numeral 70 is a storage means which stores electrical power that is generated by the electrical generating means 3.

Next, the operation of an electrical-generating electronic watch of the past will be described.

The overall control circuit 1 includes a watch circuit (not shown in the drawing), and outputs time information to the display means. The display means 6 receives that information, and indicates the time and the like on an LCD or by means of indicating hands.

The overall control means 1 also outputs the sampling signal P1 to a charging voltage detection means 20 every hour, for example. By means of this sampling signal P1, the overcharging voltage detection means 20 measures the voltage value of the storage means 70, and if the voltage value exceeds a prescribed voltage (for example 2.6 V), the full-charge detection signal P20 is output.

The overcharging prevention means 4 receives this full-charge detection signal 20 in response to which it turns on, thereby closing a switch, the result of which being that the electrical generating means 3 is shorted, so that electromotive power is not supplied to the electrical storage means 70.

Therefore, it is possible to prevent unnecessary overcharging. Additionally, the full-charge detection signal P20 is also output to the overall control circuit 1, which results in the overall control circuit 1 outputting the display control signal P6. At the display means 6, this display control signal P6 is received, and notification is made that the full-charge condition has been reached.

Recently, titanium-lithium ion secondary cells (hereinafter abbreviated as TL cells), which are large-capacity secondary cells, have come into use as a power source for electrical-generating electronic watches such as described above. This type of TL cell has a significantly greater capacity than even the large-capacitance capacitors used in the past, and as a result there has been a great increase in watch operating time of several months from the full charge condition.

However, a TL cell has charge-discharge characteristics such as shown in FIG. 13, so that it is difficult to gain a grasp of the stored electrical charge by merely measuring the battery voltage such as done in the past. Thus, in an electronic watch that makes use of this type of TL cell, it was not possible to obtain a notification of the so-called full-charge condition, in which operation is possible without any electrical power at all.

There are many known methods of detecting the residual capacity in an electrical storage means and indicating the results thereof.

For example, in the Japanese Unexamined Patent Publication (KOKAI) No. 54-53328, there is language with regard to a method of measuring the residual capacity in a silver battery, the specific method therefor being that of predicting the change in the internal resistance of the silver battery, connecting a load resistance that is equivalent to the predicted internal resistance and measuring the voltage as a means of measuring the residual capacity of the silver battery.

This known technology, however, is strictly with regard to silver batteries, and belongs in a different technology category than that of the power source for a rechargeable electronic apparatus such as in the present invention. For this reason, it is difficult to apply the above-noted prior art as is to the present invention.

In the Japanese Examined Patent Publication (KOKOKU) No. 53-16098, there is disclosure of technology for determining the residual capacity of a storage battery by means of the open-circuit voltage immediately after completion of discharging.

The basic technological concept therein is that of opening the battery after the completion of discharging, however, and in an electronic apparatus such as an electronic watch, which is the target device of the present invention, it is not possible to place the power source in a completely open condition. That is, the present invention only cuts off the path between the electrical generating/charging device and the power source, so that the above-noted prior art cannot be applied thereto.

DISCLOSURE OF THE INVENTION

An object of the present invention is to provide an electrical-generating electronic apparatus such as a rechargeable electronic watch that enables easy detection of the charge capacity of the cell and easy verification of this by the user thereof so as to improve the above-mentioned problems in the conventional technologies, even when using a titanium-lithium ion secondary cell or other type of high-capacity secondary cell as an electrical storage means.

A more particular object of the present invention is to provide an electrical-generating electronic apparatus that is capable of notifying the user thereof of the full-charge condition of the above-noted electrical storage means.

To achieve the above-noted objects, the present invention has the following basic technical constitution. Specifically, it is provided with an electrical generation means, an electrical storage means which stores electromotive power from the electrical generation means, a reverse-flow prevention means which prevents reverse flow of a charging current to the electrical storage means, and a time display means having as its power supply an electrical storage means that is charged by the electrical generation means. The rechargeable electronic watch further comprises, a charging condition detection means that, detects a charging condition of the electrical storage means, a charging cutoff means which is provided in a charging path between the electrical generation means and the electrical storage means, and a charging condition notification means which makes notification of the charging condition, based on a detection signal from the charging condition detection means, wherein during detection by the charging condition detection means of the charging condition of the electrical storage means during charging thereof, the charging cutoff means is caused to operate, thereby cutting off the charging.

That is, in the present invention, in the electrical storage means used, which includes a titanium-lithium ion cell or the like, for the purpose of accurately judging output voltage of the electrical storage means or of accurately judging the residual capacity of the electrical storage means, the voltage value or current value of the electrical storage means at the present time is compared with a priorly established reference value, and when measuring the voltage value or current value a charging cutoff means that is provided between a prescribed power supply means or electrical generation means and the electrical storage means is caused to operate, to cut it off from the power supply means or electrical generation means.

Additionally, the configuration of the present invention is such that, if the detected voltage or current corresponds to a priorly established prescribed value, the charging cutoff means is caused to operate.

Another aspect of a rechargeable electronic apparatus according to the present invention is configured so that the detected charging condition is not an arbitrary voltage value or current value, but rather is the full-charge condition.

That is, a rechargeable electronic apparatus of this aspect of the present invention is a rechargeable electronic watch that is provided with an electrical generation means, an electrical storage means which stores electromotive power from the above-noted electrical storage means, a reverse-flow prevention means which prevents reverse flow of a charging current to the above-noted electrical storage means, a time display means having as a power source an electrical storage means that is charged by the above-noted electrical generation means. This rechargeable electronic watch further having a full-charge detection means which detects whether or not the electrical storage means is in the full-charge condition, a charging cutoff means disposed in the charging path between the above-noted electrical generation means and the above-noted electrical storage means, and a full-charge notification means which makes notification, based on a detection signal of the above-noted full-charge detection means, that the full-charge condition has been reached, and during the detection by the above-noted full-charge detection means of the full-charge condition, the above-noted charging cutoff means is caused to operate, thereby cutting off the charging.

Additionally, the above-noted full-charge detection means is formed by a voltage measurement section which measures the voltage value of the above-noted storage means and outputs voltage measurement data, and a voltage-drop detection section which, based on at least two voltage measurement data from the above-noted voltage measurement means, if the voltage drop value at a prescribed time is within an arbitrary reference voltage value, detects this as the full-charge condition, and outputs a full-charge detection signal.

Additionally, a measurement starting time detection means is provided which, when the voltage value of the above-noted electrical storage means, based on voltage measurement data from the above-noted voltage measurement section, is detected as being at or greater than the prescribed voltage value, outputs a full-charge measurement start signal for the purpose of controlling the start of the measurement of the full charge and, based on the full-charge measurement start signal from the above-noted measurement starting time detection means, the above-noted voltage-drop detection section starts to perform the detection operation.

Additionally, an electromotive power measurement means which measures the electromotive power from the above-noted electrical generating means is provided and, based on the measured value of this electromotive force measurement means, the above-noted prescribed voltage value to which the voltage value of the above-noted electrical storage means in the measurement starting time detection means is compared, is switched.

Additionally, an electromotive power measurement means which measures the electromotive power from the above-noted electrical generating means is provided and, based on the measured value of this electromotive force measurement means, the above-noted reference value, to which the voltage drop value of the above-noted voltage drop detection circuit is compared, is switched.

SIMPLE DESCRIPTION OF THE DRAWINGS

PREFERRED EMBODIMENTS OF THE PRESENT INVENTION

The configuration of an example of a rechargeable electronic apparatus, such as a rechargeable electronic watch, according to the present invention will be described in detail below, with references made to the relevant drawings.

Figure 1:
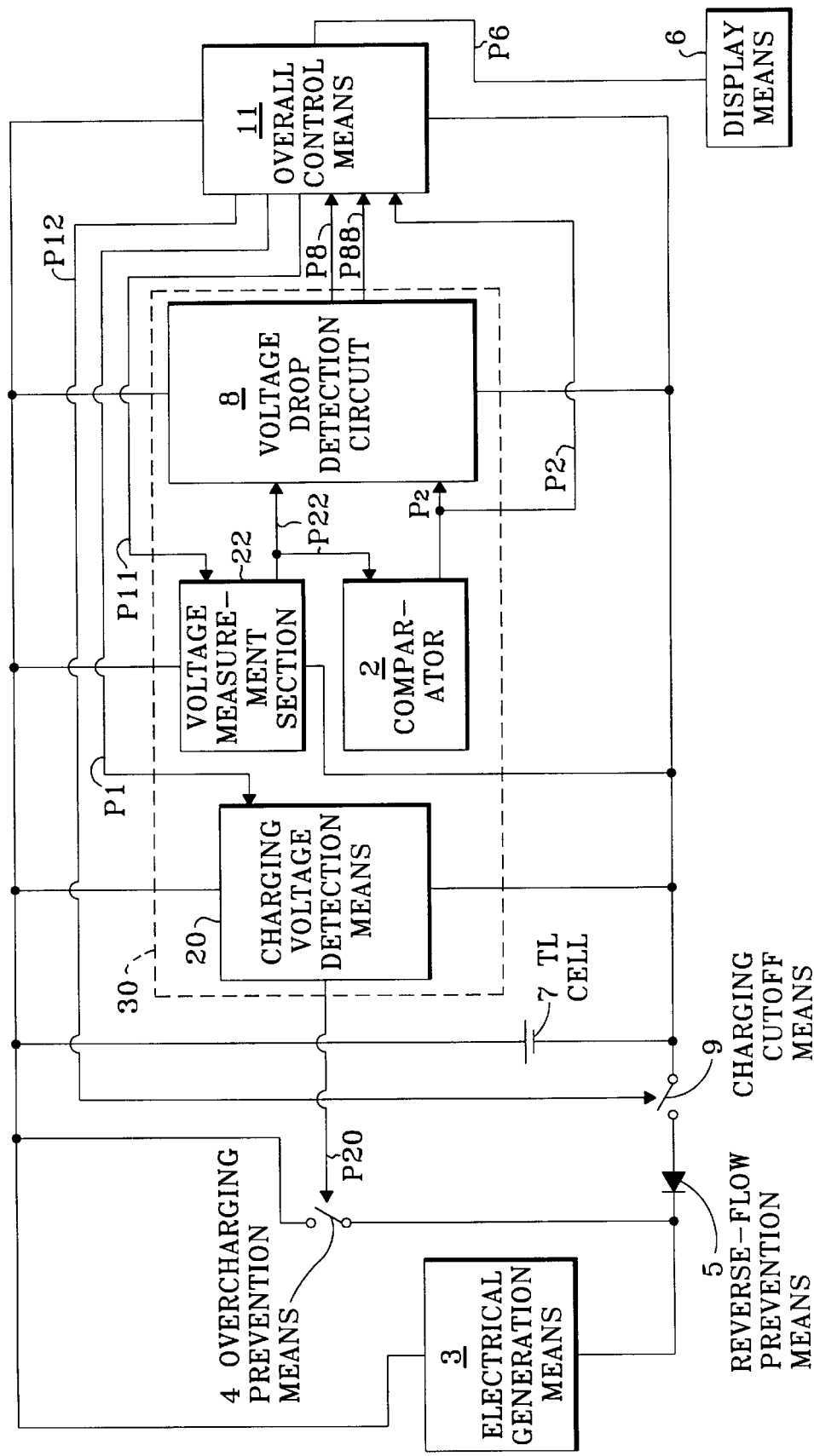
FIG. 1 is a circuit block diagram which shows the first embodiment of a rechargeable electronic apparatus according to the present invention.

Specifically, FIG. 1 is a block diagram that shows the configuration of one example of a rechargeable electronic watch according to the present invention, in which is shown rechargeable electronic watch 100, which is shown as having an electrical generation means 3, a electrical storage means 7, which stores electromotive power from the electrical generation means 3, a reverse-flow prevention means 5, which prevents reverse flow of charging current to the above-noted electrical storage means 7, and an information display means 6, which includes a time display means having as a power supply the electrical storage means 7 that is charged based on the electrical generation means 3.

This rechargeable electronic watch 100 further has a charging condition detection means 30, which detects the charging condition of the above-noted electrical storage means 7, a charging cutoff means 9, which is provided in the charging path between the electrical generation means 3 and the electrical storage means 7, and a charging condition notification means 6 that, based on a detection signal of the charging condition detection means 30, makes notification of the charging condition of the rechargeable battery, the electronic watch being configured so that when the above-noted charging condition detection means 30 is detecting the charging condition of the rechargeable battery 7 during its charging, the charging cutoff means 9 is caused to operate, thereby cutting off the charging.

The charging condition with regard to the rechargeable electronic apparatus in this example is judged based on either the charging voltage value or the charging current value.

Figure 14:
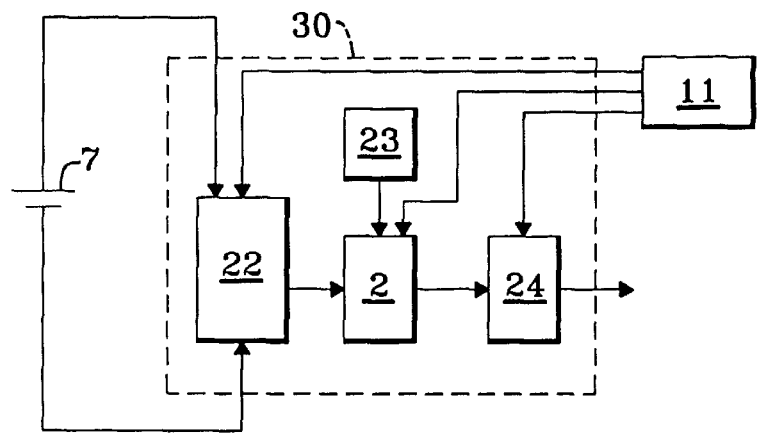
FIG. 14 is a block diagram which illustrates the configuration of one specific example of a charging condition detection means that is used in the first example of the present invention.

In the above-noted example of the present invention, the charging condition detection means 30 can also be configured so as to detect the full-charged condition of the electrical storage means 7 and, by storing for example a number of set reference values into the memory means 23, which is shown in FIG. 14 and which will be described later, it is possible to detect not only the full-charged condition, but also the amount of residual capacity in the electrical storage means 7.

Figure 13:
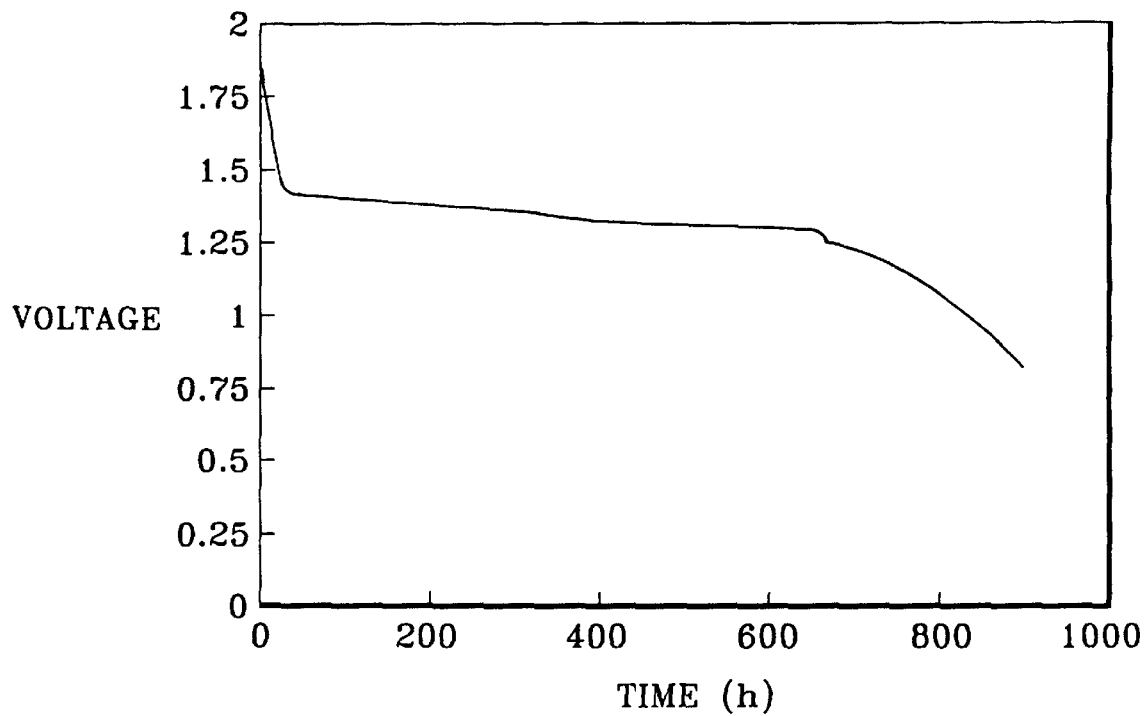
FIG. 13 is a drawing which shows the discharging characteristics of a TL cell.

That is, the above-noted example of the present invention is particularly effective with respect to a power supply the voltage of which, as shown in FIG. 13 varies non-linearly, with respect to which it is not possible to determine the residual capacity by merely measuring the voltage thereof.

Therefore, if the latter is the purpose, the above-noted charging condition detection means 30 preferably has a configuration such as shown in FIG. 14, rather than that shown in the block diagram of FIG. 1.

That is, it is preferable that the configuration of the charging condition detection means 30 in the present invention have a charging condition measurement means 22 which either measures the charging voltage of the electrical storage means 7 or detects the charging current to the rechargeable battery, and a memory means 23 in which are stored a plurality of levels of set reference voltage values or reference current values, a comparison means 2 which performs a comparison between a voltage value or reference current values of the electrical storage means that is measured by the charging condition measurement means with the corresponding reference value thereof that is stored in the memory means, and output means which outputs the results of this comparison by the comparison means 2.

The number of the plurality of prescribed mutually different reference voltage or current values that is stored in the memory means, and the interval therebetween, is arbitrary, and there is no particular limitation placed thereon, but it is desirable that these be established in accordance with the accuracy required of the charging condition detection of the electrical storage means for the rechargeable electronic watch.

For example, with a plurality of reference voltages to be detected, if the interval therebetween in made narrow, the comparison calculation circuit in the comparison circuit will become complex, and the accompanying increase in cost should also be considered.

Specifically, in the case of using a charging condition detection means configured as described above, when making a comparison of the present voltage or current at the electrical storage means 7 with the plurality of steps of set reference values, if the values are within the range of the plurality of reference values, it is possible to make notification of the reference voltage value or current value, via an appropriate display means 6, as the present voltage value or current value of the electrical storage means 7.

When doing this, at the time that a measurement is made to detect the charging condition in the electrical storage means as described above, it is necessary to cutoff and measure the voltage or the current that is supplied to the electrical storage means 7.

That is, in the present invention it is desirable that the charging cutoff means 9 be configured so that, in response to the timing of execution of the detection of the charging condition of the electrical storage means 7, the charging path between the electrical generation means 3 and the electrical storage means 7 is cutoff.

Another example of the present invention, which has a circuit configured so that a judgment is made as to whether or not the electrical storage means 7 is in the full-charged condition, will be described in terms of configuration and operation below, with reference being made to the relevant drawings.

Figure 2:
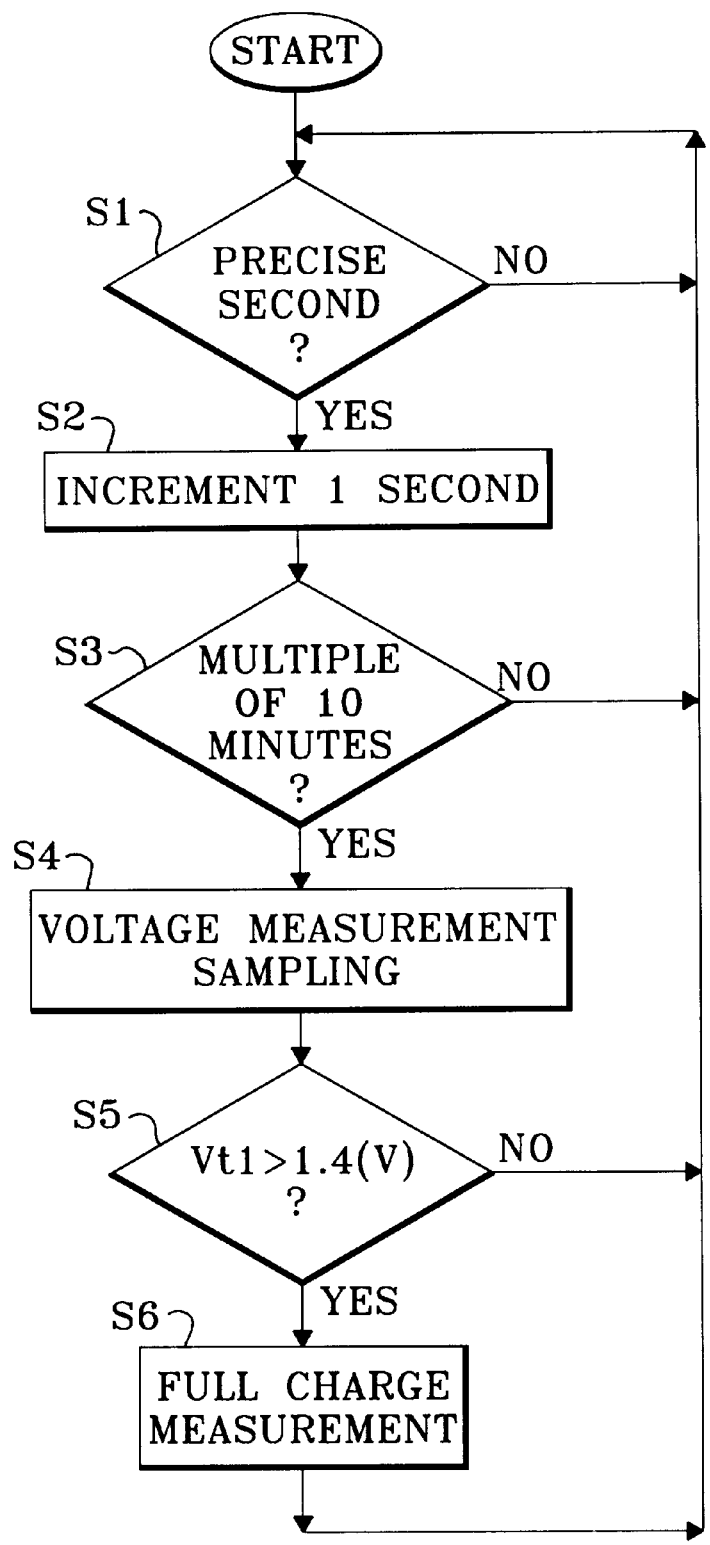
FIG. 2 is a flowchart which shows the operation of the present invention.
Figure 3:
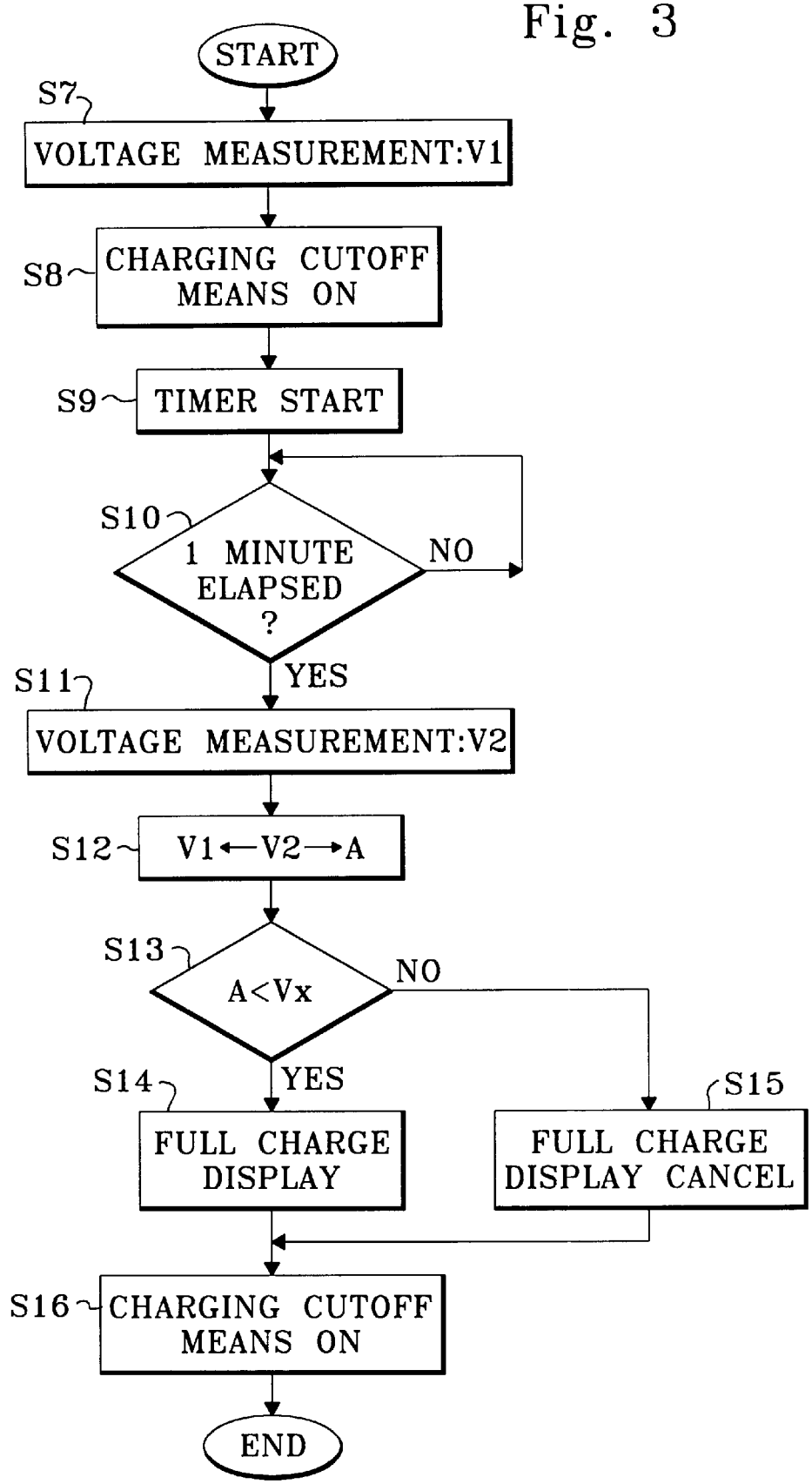
FIG. 3 is a flowchart which shows the operation of the present invention.
Figure 4:
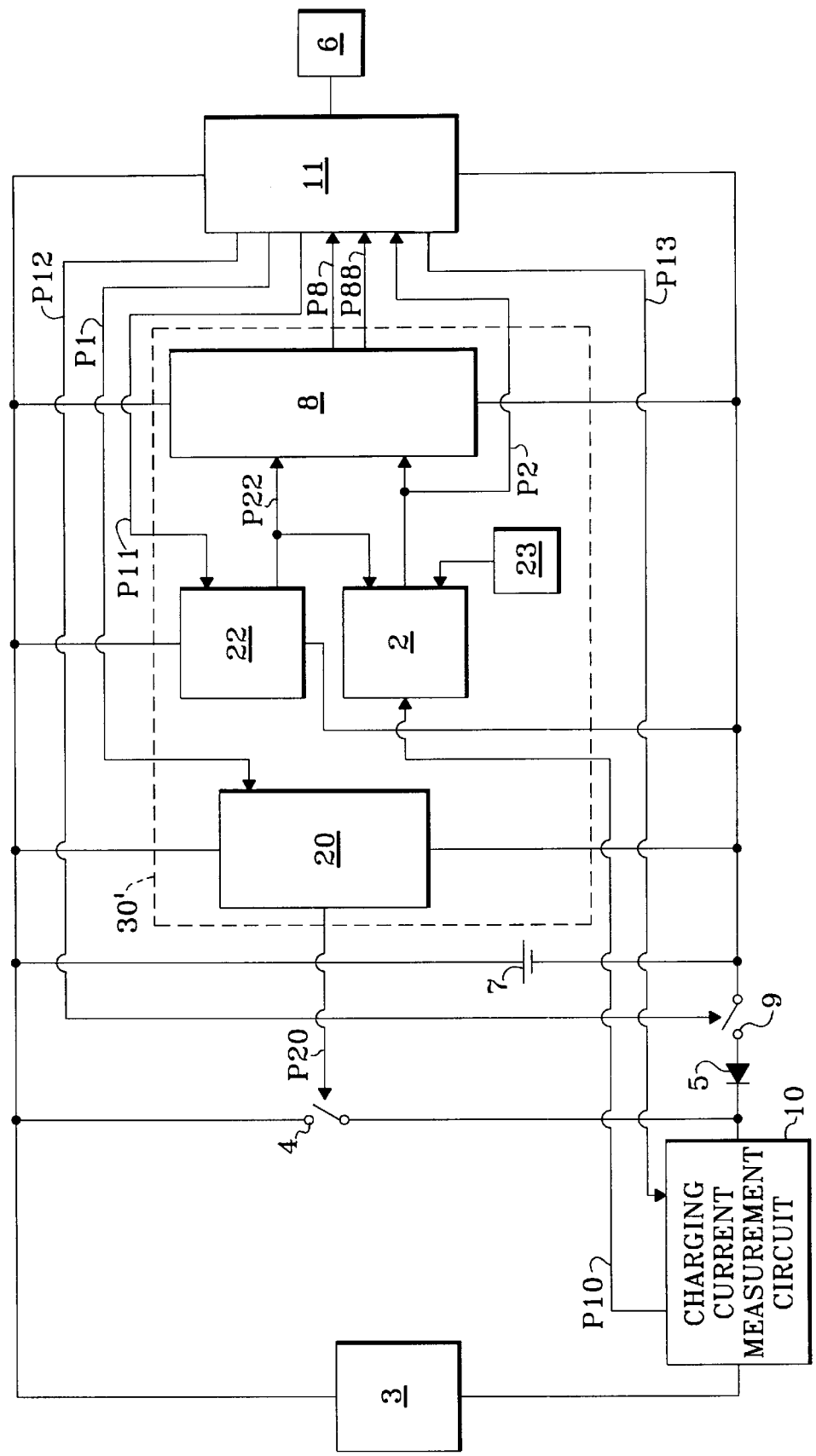
FIG. 4 is a circuit block diagram which shows the second embodiment of the present invention.
Figure 12:
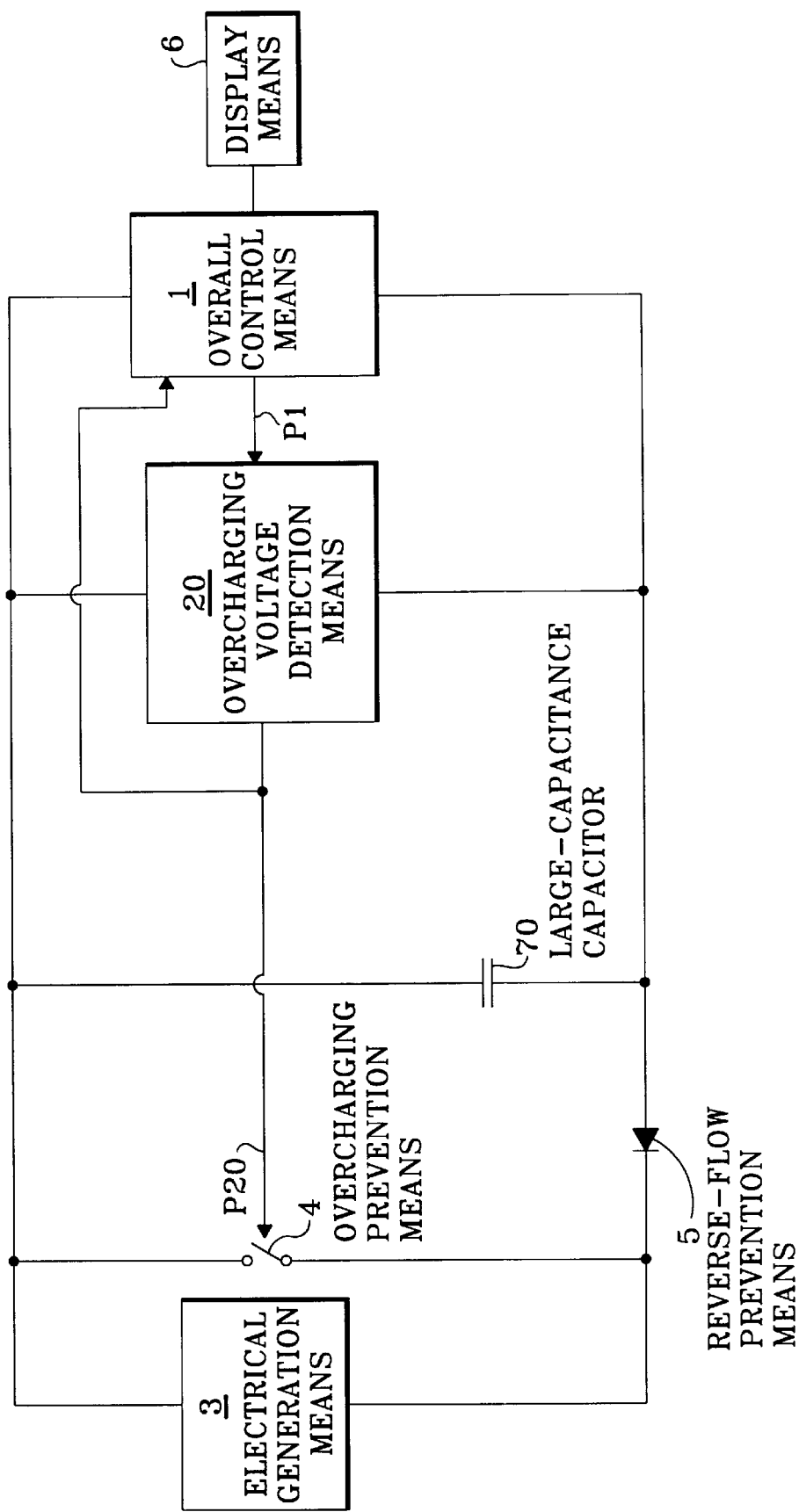
FIG. 12 is a circuit block diagram of the prior art.

FIG. 4 is a circuit block diagram of an embodiment of a rechargeable electronic watch having a full-charge display function, this representing the second embodiment of the present invention. In the block diagram shown in FIG. 1, elements that are the same as the prior art which is shown in the circuit block diagram of FIG. 12 are assigned the same reference numerals and will not be explicitly described. FIG. 2 and FIG. 3 are flowcharts which show examples of the operation of the rechargeable electronic watch which is shown in FIG. 1.

In FIG. 4, the reference numeral 11 denotes an overall control circuit which includes an internal clock circuit and which performs such control as of full-charge detection, 7 is a titanium-lithium ion secondary cell (hereinafter abbreviated as TL cell), 22 is a voltage measurement section, 30' is a full-charge detection means corresponding to the charging condition detection means 30 in the above-noted example, which includes a voltage measuring section 22 and a voltage drop detection section 8, each of these being disposed in parallel to the charging voltage detection section 20. The above-noted full-charge detection means 30' further includes a comparator 2, which is a measurement starting time detection means.

It is desirable that the above-noted full-charge detection means 30' in the above-noted example include a function which detects an overcharging condition with respect to the electrical storage means 7, and it is also desirable that when the full-charge detection means 30' detects the overcharging condition of the electrical storage means 7, it causes, by means of an appropriate signal, the overcharging prevention means 4, which is disposed separately and in parallel to the electrical generating means 3, to operate, thereby stopping the charging operation.

The voltage measurement section 22, based on the sampling timing of the voltage measurement sampling signal P11 generated from the the overall control means 1, which controls the timing of voltage measurement, measures the voltage across the terminals of the TL cell 7, and outputs the voltage measurement data signal P22 to the above-noted comparator 2 which, in the case in which the measured voltage value is larger than the reference voltage value of 1.4 V, outputs a one-shot full-charge measurement start signal P2.

The voltage measurement section 22 also outputs the detection voltage data signal P22 with regard to the TL cell 7, which was detected at the time of the full-charge measurement, to the above-noted voltage drop detection section 8.

The voltage drop detection section 8, based on the full-charge measurement start signal P2 from the comparator, starts measurement of the full-charge and, based on the input data of the voltage measurement data signal P22 from the voltage measurement section 22, a judgment is made as to whether or not the TL cell is at full charge.

If it detected as being at full charge, the voltage drop detection section 8 outputs the full-charge detection signal P8, but if it is not in the full charge condition, it outputs the not-full charge detection signal P88.

The overall control means 11, based on the full-charge measurement start signal P2 from the comparator 2, outputs the cutoff control signal P12 to the charging cutoff means 9, which is disposed in series with the reverse-flow prevention means 5 and, if the full-charge detection signal P8 from the voltage drop detection section 8 was input, it outputs control signal P6 with respect to the display means 6 which includes a full-charge notification means, so as to display notification of the full charge.

However, if the non-full charge detection signal P88 was input, the overall control means 11 outputs a control signal to the display means 6 so as to cancel the full-charge display.

Next, the operation of the rechargeable electronic watch shown in block diagram form in FIG. 1 will be described, using the flowcharts of FIG. 2 and FIG. 3. FIG. 2 is the main flowchart, and FIG. 3 is a flowchart which shows the full-charge measurement subroutine of step 6 (steps to be designated with a prefix of S hereinafter) in FIG. 2.

Referring to the main flowchart of FIG. 2, after the START, at step S1 the time reference counter within the overall control means 11 is used to judge whether the time is at a precise second. If the result is NO, the process returns is to the previous step S1, and if the result is YES, the "increment by 1 second" causes a 1-second increment signal to be output from the overall control means 11s, causing the time display of the display means 6 to advance by 1 second.

Next, at step S3 the time reference counter within the overall control means 11 is used to perform a judgment of whether the time is at the 10 minute, 20 minute, 30 minute, 40 minute, 50 minute or precise hour position.

At step S3 if the result is NO, return is made again to step S1, but if the result is YES the "voltage measurement sampling" at step S4 causes measurement of the voltage across the terminals of the TL cell 7 by the voltage measurement section 22, based on the sampling timing of the voltage measurement sampling timing signal P11 from the overall control means 11, which controls the timing of the voltage measurement at a 10-minute period. (The voltage measurement sampling signal P11 is a 10-minute period voltage measurement sampling signal unless the full-charge condition is in effect.)

Then, at "Vt1>1.4 V" of step S5, if the measured voltage Vt1 is compared with a reference voltage of, for example, 1.4 V, which represents the full-charge condition, and a judgment is made as to whether or not the measured voltage VT1 is larger than this reference voltage value of 1.4 V.

There is no limitation of the reference voltage value that represents the full-charge condition to a single value, and it is possible to set a plurality of reference voltage values.

Next, at the branches of step S5, if the result is NO, the process returns again to step S1, but if the result is YES, the full-charge measurement start signal P2 is output from the comparator 2, and control proceeds to the full-charge measurement at step S6.

With regard to the full-charge measurement at step S6, refer to the flowchart of FIG. 3, which shows the full-charge measurement subroutine.

Referring to the flowchart of FIG. 3, after START, at the "voltage measurement: V1" of step S7 the voltage measurement section 22 measures the voltage across the terminals of the TL cell 7, based on the sampling timing of the voltage measurement sampling signal P11, from the overall control means 11, which controls the timing of voltage measurement, and supplies the resulting voltage measurement data signal P22 to the voltage drop detection section 8, this being accepted by the voltage drop measurement section 8 as V1.

Next, at "charge cutoff means on" of step S8, the overall control means 11, based on the full-charge measurement start signal output from the comparator 2, outputs the cutoff control signal P12 to the charging cutoff means 9 as a high level (controlling the cutoff to be on), thereby cutting of the charging to the TL cell 7 from the electrical generation means 3.

Next, at step S9 the timer is started, which is the starting of a 1-minute timer that is included within the overall control means 11.

Then, at step S10 a judgment is made as to whether or not the 1 minute timer time has been reached. At the branches of step S10, if the result is NO, return is made to the point before step S10, but if the result is YES, at the "voltage measurement: V2" at step S11 the voltage measurement section 22, based on the sampling timing of the voltage measurement sampling signal P11 from the overall control means 11, which controls the timing of voltage measurement, measures the voltage across the terminals of the cell 7, and supplies the resulting voltage measurement data signal P22 to the voltage drop detection section 8, which accepts this as V2.

Next, at the "V1−V2→A" of step S12, the calculation of V1−V2 is performed at the voltage drop detection section 8, which had accepted the voltage measurement data V1 and V2, the voltage difference between the two being accepted by the voltage drop detection section 8 as A.

Next, at "A<X(v)" of step S13, a judgment is made as to whether or not A is smaller than (or within) the constant X(v) (this constant X(v) being dependent upon the characteristics of the cell 7 which is used as a secondary cell). At the branches of step S13, if the result is YES, control proceeds to step S14, the full-charge display, at which the full-charge condition is detected by the voltage drop detection section 8, which outputs a full-charge detection signal P8, based on which a control signal is output to the display means 6 by the overall control means 11 so as to display the full-charge condition on the display means 6.

The principle of the detection the charging condition is that if after the cell 7 reaches 1.4 V further charging is done the voltage of the cell 7 drops, as indicated by the characteristics shown in FIG. 13.

Figure 11:
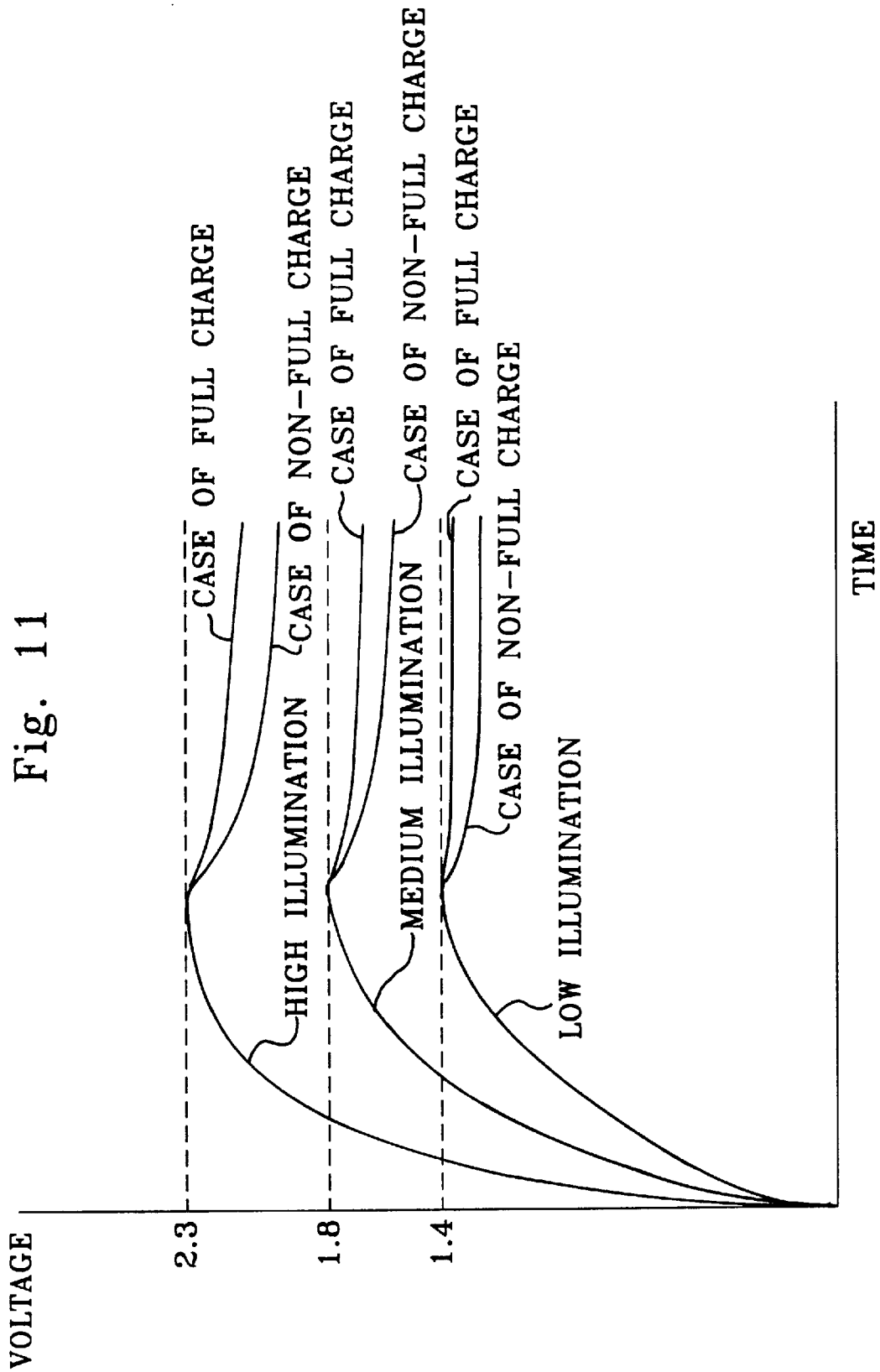
FIG. 11 is a drawing which shows the charging/discharging characteristics of a TL cell for varied illumination.

As shown in FIG. 11, compared to the case in which the condition is not the full charge condition, the voltage drop characteristics for the case of the full charge condition exhibit less voltage drop. At the branching at step S13, the difference in these characteristics is used in making the judgment of the full-charge detection.

If, however, the result at step S13 is NO, at the full-charge display cancellation at step S15 the voltage drop detection section 8 detects that the condition is not the full-charged condition, and outputs the not-full charge detection signal P88, based upon which the overall control means 11 outputs a control signal to the display means 6 so that the full-charge display is canceled, thereby canceling the full-charge display on the display means 6.

Next, at step S16 the charging cutoff is switched off and, based on the full-charge detection signal P8 or the not-full charge detection signal P88 output from the voltage drop detection section 8, the shutoff control signal P12 with respect to the charging shutoff means 9 from the overall control means 11 changes to low level (shutoff off control), which restarts the charging of the cell 7 from the electrical generation means 3.

Then the full charge measurement subroutine ends, and return is made to the main flowchart.

The return point on the main flowchart shown in FIG. 2 is the point after the full charge measurement at step S6, that is, the point before the branch at which a determination is made at step S1 of whether the time is a precise second, after which the operation described above is repeated.

Figure 7:
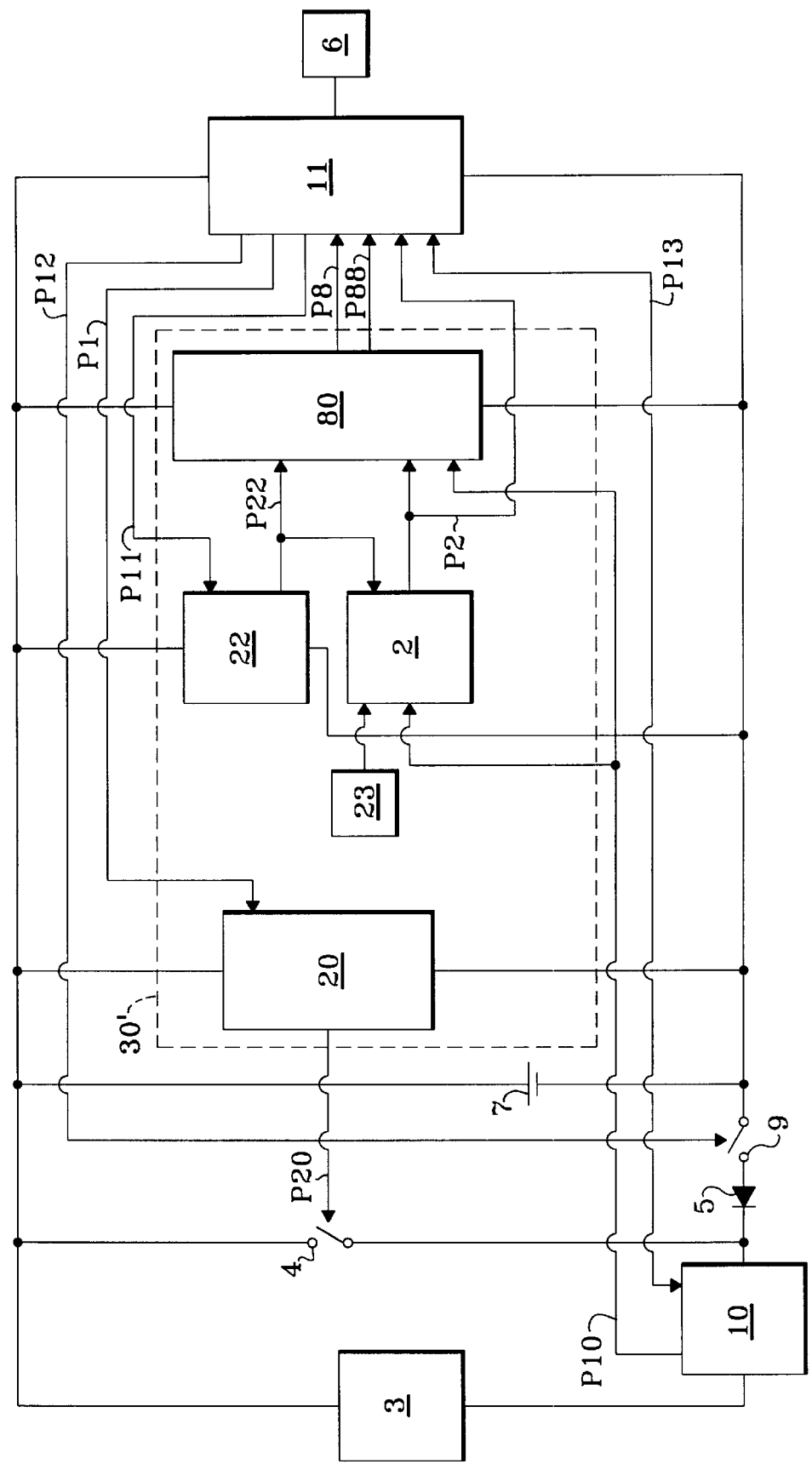
FIG. 7 is a circuit block diagram which shows the third embodiment of the present invention.

FIG. 7 is a circuit block diagram of a rechargeable electronic watch embodiment with a full-charge display function which is presented as the third embodiment of the present invention. Of the elements in the block diagram of FIG. 7, those that are the same as corresponding elements in the second embodiment, which is shown in FIG. 4, have been assigned the same reference numerals and will not be explicitly described.

Figure 5:
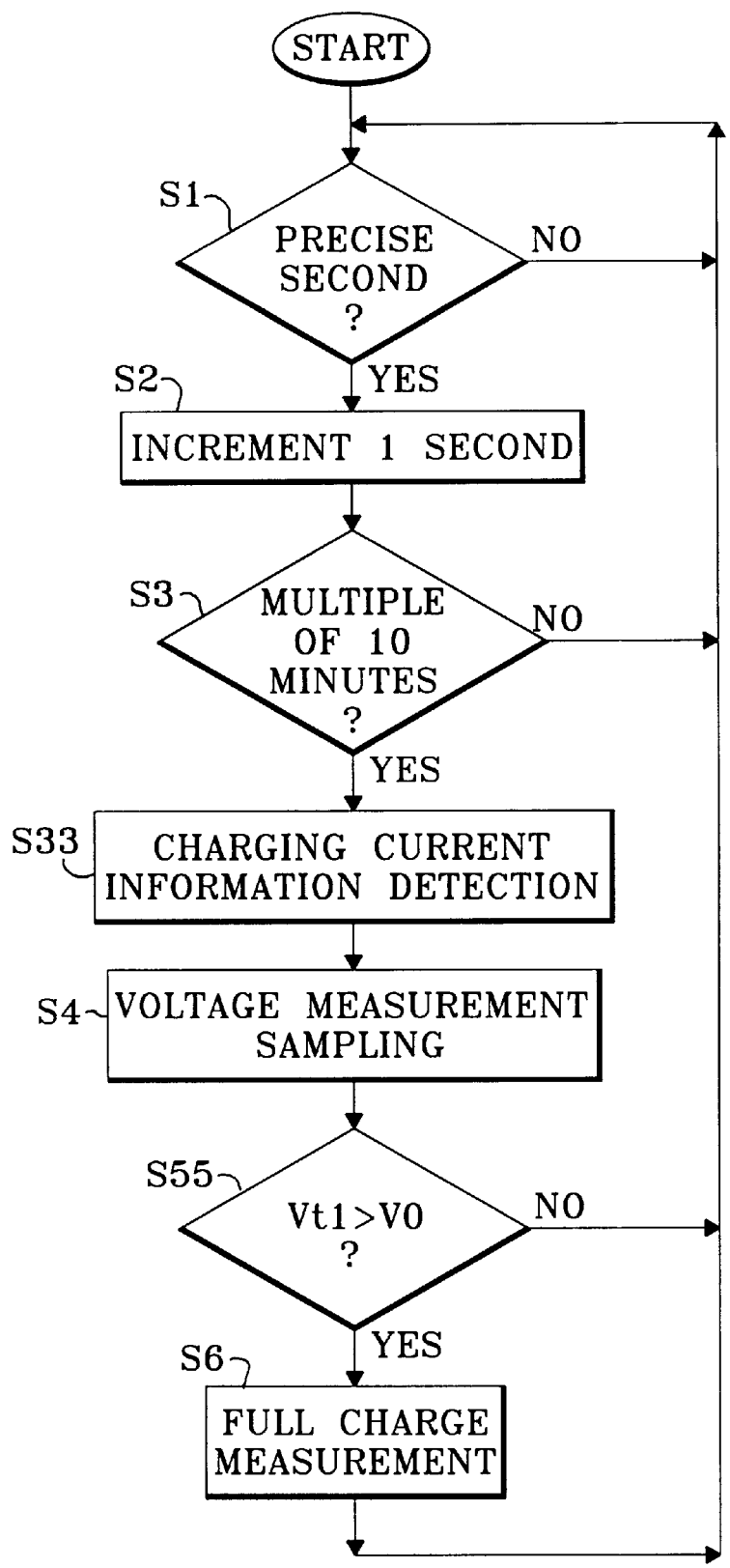
FIG. 5 is a flowchart which shows the operation of the present invention.
Figure 6:
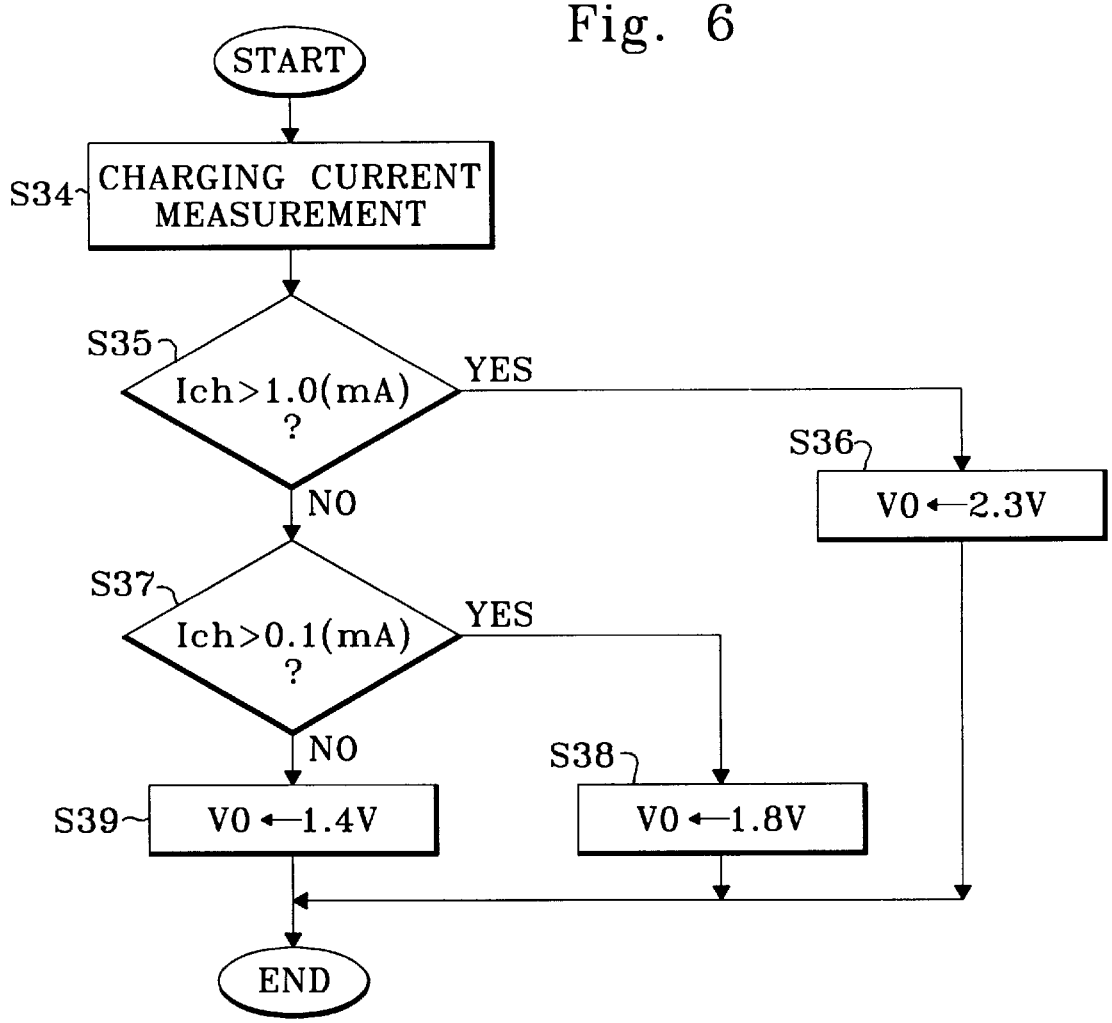
FIG. 6 is a flowchart which shows the operation of the present invention.

FIG. 5 through FIG. 6 are flowcharts which show an example of the operation of the rechargeable electronic watch that is shown in the block diagram of FIG. 4.

With respect to the second embodiment shown in FIG. 4, this embodiment is provided with a charging current measurement circuit 10 (in the case in which the electrical generation means 3 is a solar cell, a means for detecting the illumination intensity with respect to the solar cell), a measurement being performed of whether the charging current is small, medium, or large, so as to perform better detection of the full-charge condition. The block diagram of FIG. 4 will now be described.

In FIG. 4, the charging current measurement means 10 is disposed in series with the electrical generation means 3 and the overcharging prevention means 4.

The charging current measurement circuit 10, based on the sampling timing of the current detection sampling signal P13 from the overall control means 11 which controls the timing of the charging current measurement, performs a measurement of the charging current to determine whether the charging current from the electrical generation means 3 is large (greater than 1 mA), medium (larger than 0.1 mA but not exceeding 1 mA), or small (0.1 mA or smaller), and outputs the charging current amount from the electrical generation means 3 as a charging current information signal P10 to the comparator 2.

The meaning of using a charging current measurement to discriminate the charging current will now be described.

If, for example, the electrical generation means 3 is a solar cell, as shown in FIG. 11 when the illumination intensity is high (when the charging current is larger than 1 mA) the cell 7 charging characteristics exhibit a rise of the charging voltage to 2.3 V, in the case of medium illumination (when the charging current is larger than 0.1 mA but not exceeding 1 mA) the voltage rises to 1.8 V, and in the case of low illumination (when the charging current is 0.1 mA or smaller), the voltage rises to only approximately 1.4 V. Making use of this difference in characteristics, at the Vt1>V0 branching of step S55 in the flowchart of FIG. 5, to be described later, if the result is YES, a jump is made to the "full charge measurement" of step S6, and the threshold voltage value V0 with which a comparison is to be made is switched.

Next, the operation of the rechargeable electronic watch that is shown in the block diagram of FIG. 4 will be described, with references being made to the flowcharts of FIG. 5 and FIG. 6. FIG. 5 is the main flowchart, and FIG. 6 is a flowchart that shows the subroutine for measuring the charging current at step S33 of FIG. 5.

The operation of the main flowchart which is shown in FIG. 5 will first be described.

At step S3 the time reference counter within the overall control means 11 is used to perform a judgment of whether the time is at the 10 minute, 20 minute, 30 minute, 40 minute, 50 minute or precise hour position. At the branching of step S3, if the result is YES, a transfer of control is made to the charging current information detection of step S33.

The charging current information detection at step S33 will be described with reference made to the charging current information detection subroutine of step S33 that is shown in FIG. 6.

In the flowchart of FIG. 6, after START, based on the sampling timing of the current detection sampling signal P13 from the overall control means 11 which controls the timing of current detection in the charging current measurement of step S34, the charging current measurement circuit 10 measures the charging current, Ich, from the electrical generation means 3, so as to measure whether the charging current from the electrical generation means 3 is large (greater than 1 mA), medium (larger than 0.1 mA but not exceeding 1 mA), or small (0.1 mA or smaller).

Then at the "Ich>1.0 mA" of step S35, a judgment is made as to whether the charging current is larger than 1.0 mA. If the result of the S35 branching is YES, at the "V0←2.3 V" of step 36 information that the measured charging current from the electrical generation means 3 was larger than 1 mA is output as the charging current information signal P10 to the comparator 2, which inputs this as V0=2.3 V, at which point the charging current detection subroutine ends. If, however, the result had been NO, transfer would have been made to the "Ic>0.1 mA" of step S37.

In order to execute the above-noted judgment operation, it is desirable, in the same manner as shown in the first embodiment described earlier, to provide an appropriate storage means 23 in addition to the above-noted comparator, and to store into this storage means 23 the above-noted voltage value or current value beforehand, so that the required data can be read out and used as necessary.

Then, at "Ich>0.1 mA" of step S37, a judgment is made as to whether the charging current is larger than 0.1 mA. If at the branching of step S37 the result is YES, at the "V0←1.8 V" of step S38 information that the measured charging current from the electrical generation means 3 was larger than 0.1 is output as the charging current information signal P10 to the comparator 2, which inputs this as V0=1.8 V, at which point the charging current information detection subroutine ends.

If, however, the result had been NO, transfer would have been made to the "V0←1.4 V" of step S39, and information to the effect that the measured charging current from the electrical generation means 3 was 0.1 mA or smaller is output as the charging current information detection signal P10 to the comparator 2, which inputs this as V0=1.4 V, at which point the charging current information detection subroutine ends.

Returning to the main flowchart of FIG. 5, at the voltage measurement sampling of step S4, in the same manner as in the first embodiment, measurement is performed of the voltage across the terminals of the cell 7. Then, at "Vt1>V0" of the subsequent step S55 a judgment is performed of whether or not the measured voltage value is greater than V0.

If at the branching of step S55 the result is NO, return is made to the point before step S1, but if the result is YES the full-charge measurement start signal P2 is output from the comparator 2 and transfer is made to the full charge measurement.

By making a determination at "Vt1>V0" of step S55 as to whether or not the detected voltage is larger than V0, as described above, at the comparator in the case in which the charging current from the electrical generation means 3 is large (larger than 1 mA), V0=2.3 V is input, in the case in which the current is medium (larger than 0.1 mA but not exceeding 1 mA) B0=1.8 V is input, and in the case in which the current is small (0.1 mA or smaller), V0=1.4 V is set, thereby performing better detection of the full charge.

That is, at the branching at step S55, in the case of a YES result, the value of V0 (Vth voltage value to be added during charging) is switched, depending upon whether the charging current is large, medium, or small, thereby performing a better transfer to the full charge measurement at step S6.

Because the flowchart of the subroutine to measure the full charge at step S6 is the same as explained with regard to the first embodiment that was described using FIG. 3, the description of this will be omitted.

Figure 8:
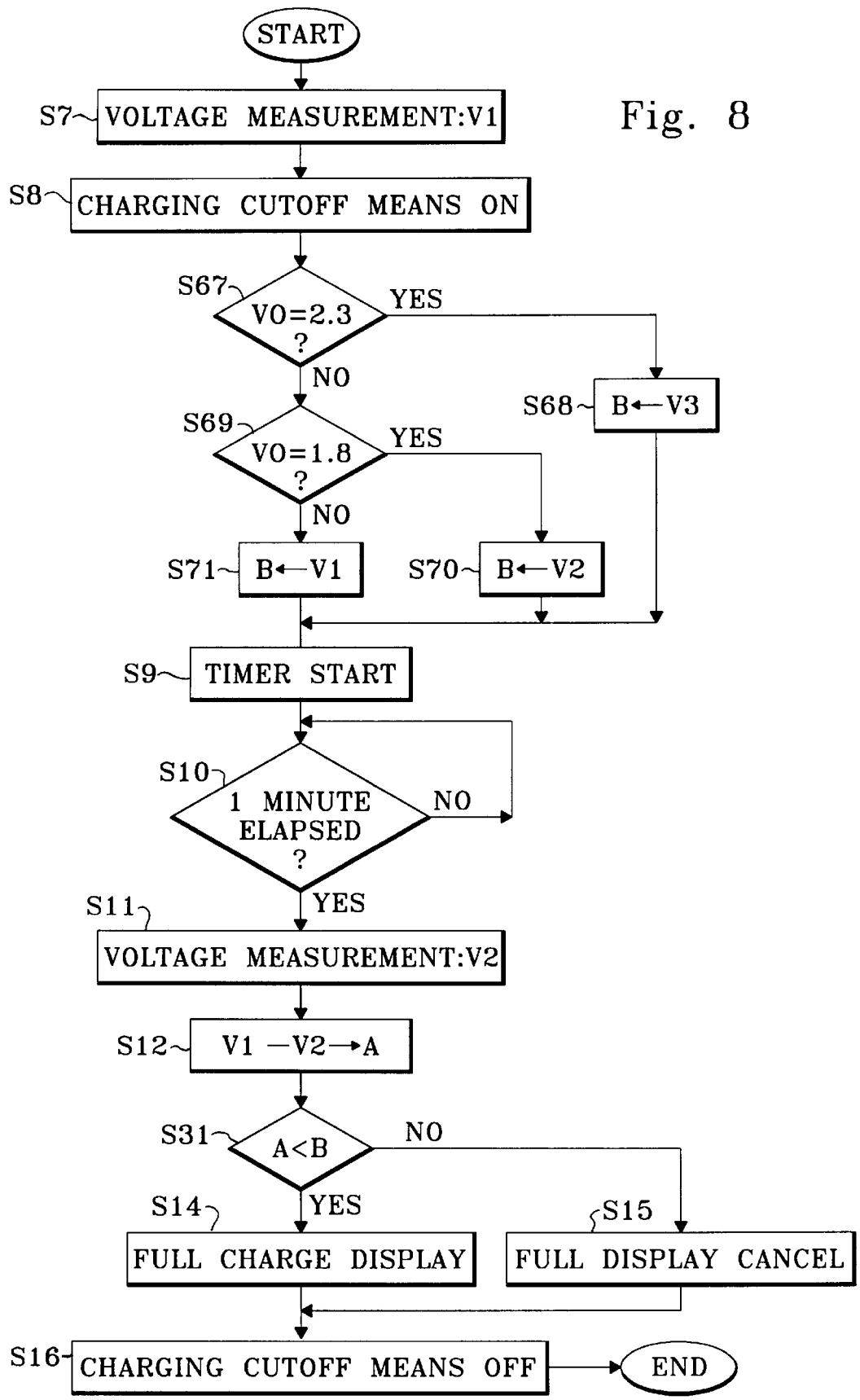
FIG. 8 is a flowchart which shows the operation of the present invention.
Figure 9:
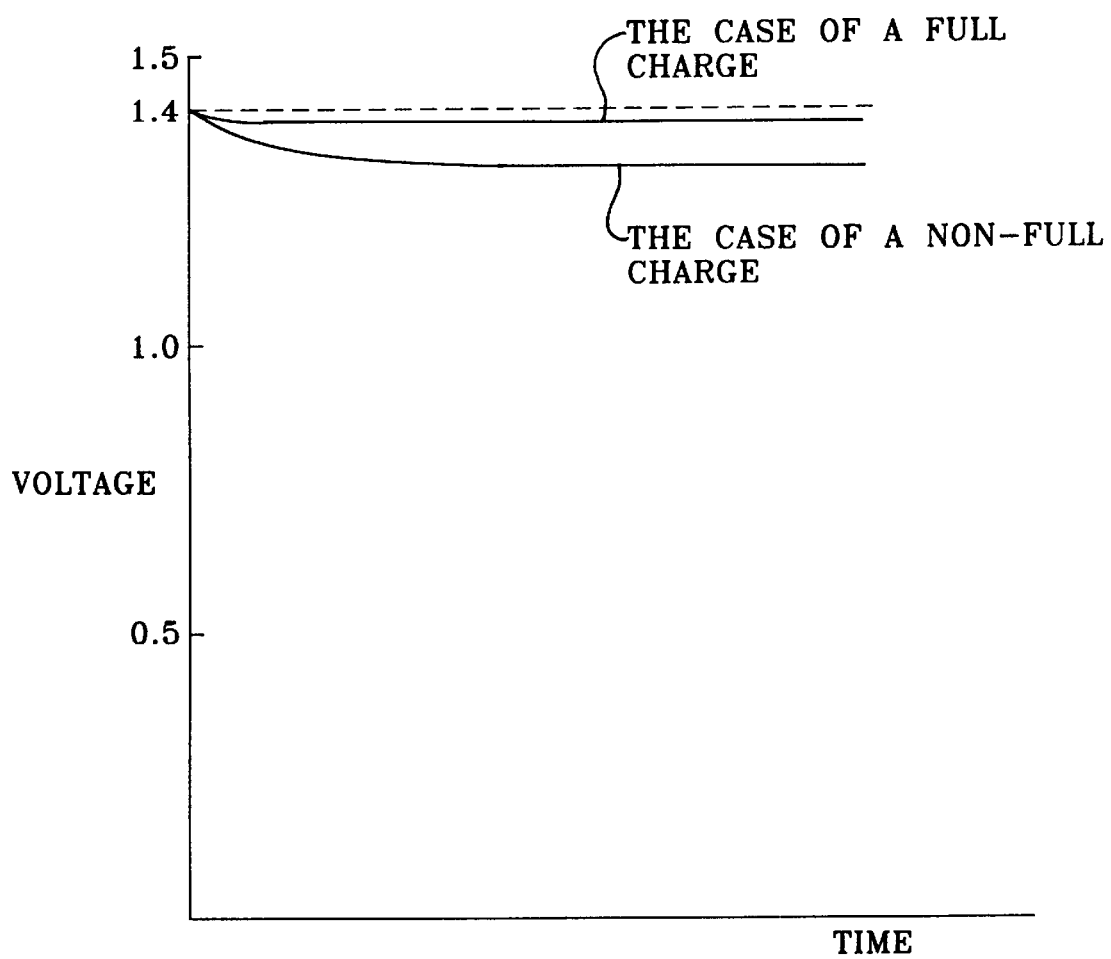
FIG. 9 is a drawing which shows the self-discharging characteristics of a TL cell.
Figure 10:
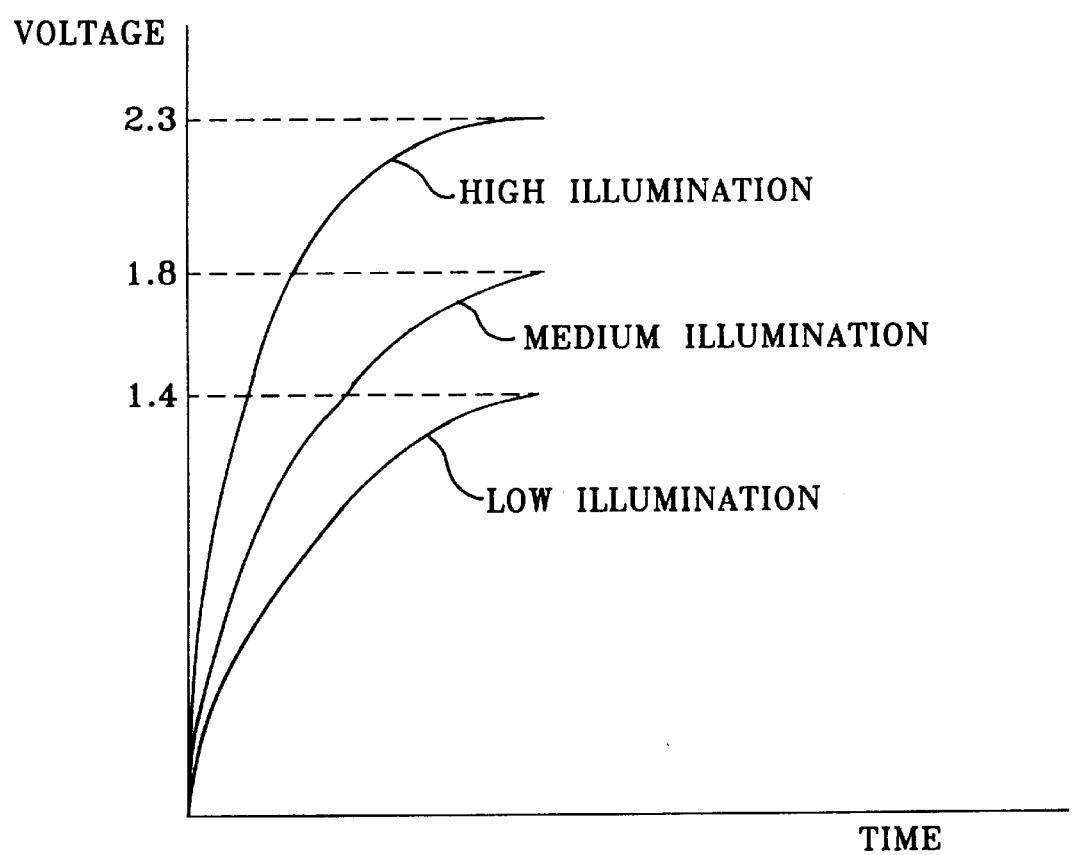
FIG. 10 is a drawing which shows the charging characteristics of a TL cell for varied illumination.

FIG. 7 is a circuit block diagram of a rechargeable electronic watch having a full charge display function, presented as the fourth embodiment of the present invention. Of the circuit block diagram of FIG. 7, elements which are the same as corresponding elements in the third embodiment that is shown in FIG. 4 are assigned the same reference numerals and will not be explicitly described. FIG. 8 is a flowchart that shows an example of the operating procedure of the rechargeable electronic watch that is show in the block diagram of FIG. 7.

The fourth embodiment of FIG. 7 is provided with a charging current measurement circuit 10 (in the case in which the electrical generation means 3 is a solar cell, a means for detecting the illumination intensity with respect to the solar cell), a measurement being performed of whether the charging current is small, medium, or large, the resulting charging current measurement information being supplied as the charging current information signal P10 as well to the voltage drop detection section 80, which serves as a full-charge detection means, thereby perform better detection of the full charge.

In FIG. 7, the charging current measurement circuit 10, based on the sampling timing of the current detection sampling signal P13 from the overall control means 11, which controls the timing of charging current measurement, measures whether the charging current from the electrical generation means 3 is large (greater than 1 mA), medium (larger than 0.1 mA but not exceeding 1 mA), or small (0.1 mA or smaller), and outputs the charging current amount from the electrical generation means 3 as a charging current information signal P10 to the comparator 2, and the charging current information signal P10 is output as well to the voltage drop detection section 80.

For the purpose of executing the above-noted judgment operation, in the same manner as in the above-noted third embodiment, to provide an appropriate storage means 23 in addition to the above-noted comparator 2, and to store into this storage means 23 the above-noted voltage value or current value beforehand, so that the required data can be read out and used as necessary.

Next, the operation of the rechargeable electronic watch shown in the block diagram of FIG. 7 will be described using the flowchart of FIG. 8. Because the main flowchart is the same as that of FIG. 5, the description thereof will be omitted. FIG. 8 is a flowchart which shows the full charge measurement subroutine of step S6 in FIG. 5.

In the flowchart of FIG. 8, after steps S7 and S8, which are similar to steps S7 and S8 of FIG. 3, transfer is made to step S67.

Then, at V0=2.3 V of step S67 a judgment is made as to whether or not V0 is equal to 2.3 V. If at the branching of step S67 the result is YES, at "B←−0.015 V" of step S68, information to the effect that the measured charging current from the electrical generation means 3 is greater than 1 mA is output as the charging current information signal P10 to the voltage drop detection section 80, and at the voltage drop detection section 80 this is input as V0=2.3 V, at which point transfer is made to step S9. If, however, the result is NO transfer is made to V0=1.8 V of step S69.

Then, at "V0=1.8 V" of step S69, a judgment is made as to whether or not V0 is equal to 1.8 V. At the branching of step S69 if the result is YES at the "B←−0.007 V" of step S70 information to the effect that the measured charging current from the electrical generation means 3 is greater than 0.1 mA but does not exceed 1 mA is output as the charging current information signal P10 to the voltage detection section 80, and at the voltage detection section 80 this is input as V0=1.8 V, at which point transfer is made to step S9.

If, however, the result was NO, at the "B←−0.001 V" of step S71 information to the effect that the measured charging current from the electrical generation means 3 is less than 0.1 mA is output as the charging current information signal P10 to the voltage drop detection section 80, and the voltage drop detection section 80 inputs this as V0=1.8 V, at which point transfer is made to step S9.

That is, at the branching from steps S67 and S69, depending upon whether the charging current is large, medium, or small, the B value in "A<B" of step S31 (corresponding to the A<Vx of step S13 in FIG. 3) is switched in accordance with the amount of current when charging the cell 7, thereby performing a better transfer to the full charge measurement of step S66. The principle of this full charge detection is based on the voltage characteristics of the cell 7, which are shown in FIGS. 9 through 11 and FIG. 13.

The above is based on the fact that the voltage drop characteristics for the cases of full charge and non-full charge after the voltage rises to 2.3 V with high illumination, to 1.8 V with medium illumination, and to 1.4 V with low illumination are different.

Qualitatively, the voltage drop characteristics exhibit the largest voltage drop after charging with high illumination, lower voltage drop after charging with medium illumination, and the smallest voltage drop after charging with low illumination, and the judgment of transfer to the "full charge measurement" at step S6 is switched appropriately based on these characteristics.

With regard to the other aspects of the flowchart that shows the charging current information detection subroutine, the flowchart that shows the full charge measurement subroutine of step S6, and other flowcharts such as the main flowchart, there content are the same as was described with regard to the first embodiment, and will not be repeated herein.

As described above, with the present invention because a voltage drop detection section 8 (voltage drop detection section 80) is provided which detects the voltage drop after supply of electrical power from the electrical generation means 3 is cut off by the charging cutoff means 9, even in the case of using an electrical storage means having characteristics such at those of a cell (titanium-lithium ion cell) 7, it is possible to detect the charging condition of the electrical storage means at any arbitrary time, thereby particularly enabling detection and display of the full charge condition of the electrical storage means.

Additionally, by providing a charging current measurement circuit 10 which is an electromotive force measurement means that measures the electromotive force of the electrical generation means 3, and by detecting by means of the output value therefrom the voltage value or voltage drop value of the electrical generation means 3 which is operated by the voltage drop detection section 8 (voltage detection section 80), it is possible to accurately display the full charge condition, without regard to the value of the electromotive force from the electrical generation means.

What is claimed is:

1. A rechargeable electronic apparatus comprising:
   an electrical generation means;
   an electrical storage means which stores electromotive power from said electrical generation means;
   a reverse-flow prevention means which prevents reverse flow of a charging current to said electrical storage means;
   an information display means which displays information;
   a charging condition detection means which detects a charging condition of said electrical storage means;
   a charging cutoff means which is provided in a charging path between said electrical generation means and said electrical storage means; and
   a charging condition notification means which makes notification of said charging condition based on a detection signal from said charging condition detection means,
   wherein during detection by said charging condition detection means of said charging condition of said electrical storage means, said charging cutoff means is caused to operate, thereby cutting off said charging.

2. A rechargeable electronic apparatus according to claim 1, wherein said charging condition is judged based on either a charging voltage value or a charging current value.

3. A rechargeable electronic apparatus according to either claim 1 or claim 2, wherein said charging condition detection means is provided with a charging condition measurement means that either measures a charging voltage of said electrical storage means or detects a charging current to said electrical storage means, a memory means that stores a plurality of steps of set reference values of voltage or current, a comparison means that performs comparison between a voltage value or a current value of said electrical storage means which is measured by said charge condition measurement means and either one of said reference values that are stored in said memory means, and an output means that outputs a result of said comparison.

4. A rechargeable electronic apparatus according to either claim 1 or claim 2, wherein said charging cutoff means comprises a function that, in response to the point in time at which the detection of said charging condition of the electrical storage means is performed, cuts off said charging path between said electrical generation means and said electrical storage means.

5. A rechargeable electronic apparatus according to claim 4, wherein said charging cutoff means, in a case in which a voltage value of said electrical storage means corresponds to a prescribed voltage value, cuts off said charging path between said electrical generation means and said electrical storage means, and wherein a residual capacity of said electrical storage means is measured.

6. A rechargeable electronic apparatus according to either claim 1 or claim 2, wherein said charging condition detection means includes a function that detects a full-charge condition of said electrical storage means.

7. A rechargeable electronic apparatus according to claim 6, further comprising a full-charge detection means which detects whether the charging condition of said electrical storage means is the full-charge condition.

8. A rechargeable electronic apparatus according to claim 7, wherein said full-charge detection means comprises a voltage measurement section that measures an output voltage of said electrical storage means and that outputs a voltage measurement data, and a voltage drop detection section that, based on at least two voltage measurement data from said voltage measurement means, if a voltage drop value at a prescribed time is within an arbitrary reference voltage value, detects this as said full-charge condition, and outputs a full-charge detection signal.

9. A rechargeable electronic apparatus according to claim 8, further comprising a measurement start detection means which, when the voltage of said electrical storage means is detected as being at least a prescribed voltage, based on said voltage measurement data from a voltage measurement section that is part of said charging condition measurement means, outputs a full-charge measurement start signal for the purpose of controlling the start of a full-charge measurement operation, and wherein, based on said full-charge measurement start signal from said measurement start detection means, said voltage drop detection section outputs a control signal that starts a detection operation.

10. A rechargeable electronic apparatus according to claim 9, wherein said charging condition detection means is provided with an electromotive force measurement means that measures an electromotive force from said electrical generation means, and wherein, based on a measured value of said electromotive force measurement means, a prescribed voltage value which is to be compared with a voltage value of said electrical storage means in said measurement start detection means is switched.

11. A rechargeable electronic apparatus according to claim 9, wherein said apparatus further comprises an electromotive force measurement means that measures an electromotive force from said electrical generation means, and wherein, based on a measured value of said electromotive force measurement means, said reference voltage value to be compared with a voltage drop value in said voltage drop detection section is switched.

* * * * *

UNITED STATES PATENT AND TRADEMARK OFFICE
CERTIFICATE OF CORRECTION

PATENT NO. : 6,060,862  
DATED : May 9, 2000  
INVENTOR(S) : Sase et al.

Page 1 of 1

It is certified that error appears in the above-identified patent and that said Letters Patent is hereby corrected as shown below:

Title Page
Please insert --[30] Foreign Applications,
Priority Data Japan 8/218988 08/21/96--

Signed and Sealed this

Twenty-sixth Day of June, 2001

Attest:

Attesting Officer

NICHOLAS P. GODICI
*Acting Director of the United States Patent and Trademark Office*